(12) United States Patent
Korcz et al.

(10) Patent No.: US 8,987,593 B2
(45) Date of Patent: Mar. 24, 2015

(54) ELECTRICAL BOX EXTENSION ASSEMBLY

(71) Applicant: Hubbell Incorporated, Shelton, CT (US)

(72) Inventors: Krzysztof W. Korcz, Grainger, IN (US); Steven J. Johnson, Buchanan, MI (US); Mahran H. Ayrton, South Bend, IN (US)

(73) Assignee: Hubbell Incorporated, Shelton, CT (US)

( * ) Notice: Subject to any disclaimer, the term of this patent is extended or adjusted under 35 U.S.C. 154(b) by 87 days.

(21) Appl. No.: 13/781,058

(22) Filed: Feb. 28, 2013

(65) Prior Publication Data

US 2014/0238738 A1    Aug. 28, 2014

(51) Int. Cl.
*H02G 3/08* (2006.01)
*H02G 3/12* (2006.01)

(52) U.S. Cl.
CPC ............. *H02G 3/086* (2013.01); *H02G 3/123* (2013.01)
USPC ................. 174/58; 174/61; 174/63; 248/343; 362/147

(58) Field of Classification Search
USPC ........ 174/61, 63, 54, 40 R, 58; 248/343, 906, 248/342, 62; 362/147
See application file for complete search history.

(56) References Cited

U.S. PATENT DOCUMENTS

| 915,381 | A | 3/1909 | Pullets |
| 4,634,015 | A | 1/1987 | Taylor |
| 5,012,043 | A | 4/1991 | Seymour |
| 5,293,003 | A | 3/1994 | Prairie, Jr. |
| 5,931,325 | A | 8/1999 | Filipov |
| 5,967,354 | A | 10/1999 | Whitehead et al. |
| 5,975,323 | A | 11/1999 | Turan |
| 6,820,760 | B2 | 11/2004 | Wegner et al. |
| 7,141,736 | B2 * | 11/2006 | Plankell .......................... 174/50 |
| 7,276,661 | B2 | 10/2007 | Wegner et al. |
| 7,301,099 | B1 | 11/2007 | Korcz |
| 7,410,072 | B2 | 8/2008 | Wegner et al. |
| 7,531,743 | B2 * | 5/2009 | Johnson et al. ................. 174/57 |
| 7,637,385 | B2 | 12/2009 | Wegner et al. |
| 8,044,300 | B1 | 10/2011 | Gretz |

* cited by examiner

*Primary Examiner* — Dhirubhai R Patel
(74) *Attorney, Agent, or Firm* — Roylance, Abrams, Berdo & Goodman, L.L.P.

(57) ABSTRACT

An electrical box extension includes a base, a movable ring and an extension ring. The base has an inwardly extending flange for coupling the base to the open end of an electrical box. The movable ring slides within the base and is captured by a screw that draws the movable ring into the base. The extension ring optionally can be coupled to the top end of the movable ring. A movable support flange can be coupled to the top end of either the movable ring or the extension ring for contacting the outer surface of the wall when the movable ring is drawn into the base.

34 Claims, 8 Drawing Sheets

ELECTRICAL BOX EXTENSION ASSEMBLY

FIELD OF THE INVENTION

The present invention is directed to an adjustable electrical box extension assembly. In particular, the invention is directed to an electrical box extension having a movable support flange for contacting the outer surface of a wall.

BACKGROUND OF THE INVENTION

Electrical boxes are commonly mounted to a stud or other support structure for supporting an electrical device and enclosing electrical wiring. The electrical boxes are often mounted in a variety of positions and locations in the wall or ceiling. The electrical box is typically attached to the stud or other support structure by nails, screws or other fasteners. In new construction, the electrical box is attached to the building stud with the open front face of the electrical box positioned so that the outer face of the drywall or paneling is essentially flush with the outer edge of the electrical box. In some forms of construction, the stud or other structure does not allow proper orientation of the electrical box so that the open end of the electrical box is recessed with respect to the outer surface of the wall when the wall is installed and finished.

Renovating old construction also can create difficulties in positioning the electrical box with respect to the outer surface of the wall. New wall board or paneling can be applied over existing walls so that the original electrical box is recessed within the wall and is not easily moved or relocated. The recessed electrical box results in the electrical device being recessed with respect to the wall and is not easily accessible.

A number of devices have been proposed providing an adjustable assembly for connecting to an outlet box that can accommodate different thicknesses of wall structures and the spacing between the outer surface of a wall and an electrical box. One example is disclosed in U.S. Pat. No. 4,634,015 to Taylor which includes a plate and an open collar disposed on the mounting plate about a central opening. A box frame slides within the collar to contact the side walls of the collar. Adjustment screws are mounted in the box to connect the frame to the collar or the mounting plate to move the box outwardly of the collar.

Another example is disclosed in U.S. Pat. No. 5,931,325 to Filipov. This patent discloses an adjustable mud ring for an electrical box having a plate that can be attached to an electrical box and a collar extending outwardly from the plate. A movable sleeve surrounds the collar and is attached to the collar by screws that adjust the position.

Still another example is disclosed in U.S. Pat. Nos. 6,820,760, 7,276,661, 7,410,072 and 7,637,385 to Wegner et al. which disclose an electrical box extension having an extending member for a switch and/or electrical receptacle. The extension member includes fastener brackets and a fastener base bracket. Fasteners extend through the fastener brackets of the base bracket to adjust the relative position of the extending member to the base.

Examples of other electrical boxes having an adjustable sleeve or collar to position the electrical device with respect to the electrical box are disclosed in U.S. Pat. No. 915,381 to Pullets, U.S. Pat. No. 740,663 to Krantz, U.S. Pat. No. 1,875,101 to Morrell, U.S. Pat. No. 2,707,221 to Frank, U.S. Pat. No. 5,293,003 to Prairie, Jr., U.S. Pat. No. 7,531,743 to Johnson et al., U.S. Pat. No. 8,044,300 to Gretz, U.S. Pat. No. 5,967,354 to Whitehead et al., U.S. Pat. No. 5,975,323 to Turan, and U.S. Pat. No. 7,301,099 to Korcz.

While each of the prior devices has been generally suitable for the intended purpose, there is a continuing need in the industry for an improved device for mounting an electrical component to an electrical box.

SUMMARY OF THE INVENTION

The present invention is directed to an electrical box extension assembly for coupling to the open end of an electrical box or a mounting plate attached to the open end of an electrical box. The invention is particularly directed to an electrical box extension that is adjustable with respect to the outer surface of the wall and the electrical box.

Accordingly one aspect of the invention is to provide an electrical box extension assembly that can be easily attached to the open end of a mounting plate or an electrical box to accommodate different thicknesses of the wall.

Another aspect of the invention is to provide an electrical box extension assembly that has a support flange for contacting the outer face of the wall when installed. The support flange can be mounted to be movable between a retracted position before installation and an extended position after installation.

The electrical box extension of the invention has a movable ring that slides freely within a base without the use of adjustment screws or complex mechanisms.

The electrical box extension of the invention includes a base and a movable ring that slides within the base. An extension ring can be coupled to the top end of the movable ring to form a single ring assembly that is movable with respect to the base.

The base of the electrical box extension is adapted for coupling to the opening in a mounting plate attached to an electrical box or to the open end of the electrical box. The bottom end of the base is provided with a coupling tab with a screw hole for receiving a coupling screw to couple the base to the mounting plate of the electrical box.

The first movable ring slides within the base from a retracted position to an extended position. The movable ring has a mounting tab at a top end for supporting an electrical wiring device such as a switch or electrical receptacle. A coupling tab is provided on the ring for coupling the movable ring to the base and positioning the ring with respect to the base and the wall surface.

In one embodiment of the invention, the coupling tab on the movable ring has a hole to allow a coupling screw to slide through. A screw is threaded into a screw hole in the base to attach the movable ring to the base and position the movable ring axially with respect to the base. The movable ring is able to slide along the length of the screw to the desired position.

The support flange is coupled to the top end of the movable ring or the extension ring to contact the outer surface of the wall when installed. The coupling screws extending through the movable ring and threaded into the base are tightened to draw the movable ring into the base and the support flange into contact with the wall surface.

The electrical box extension assembly of the invention can be a preassembled kit including a base, a movable ring attached to the base, an extension ring coupled to the movable ring and cover coupled to the extension ring. The support flange is pivotally connected to the top end of the extension ring and pivoted inwardly so that the support flange is oriented within the extension ring. During use, the support flange is pivoted outwardly to extend from the top end of the extension ring a distance to contact the wall surface.

These and other features of the invention are basically attained by providing an electrical box extension comprising a base having a top end and a bottom end. The bottom end is adapted for coupling to an electrical box. A movable ring is received in the base for sliding axially within the base. The movable ring has a top end and a bottom end. The top end has a movable tab adapted for supporting an electrical wiring device. The movable ring has a support flange with a dimension to contact an outer surface of a wall during installation of the electrical box extension. A coupling member has one end coupled to the movable ring and a second end coupled to the base. The coupling member is adapted for drawing the movable ring into the base and the flange into contact with the outer surface of the wall for supporting the movable ring.

The various features of the invention are further attained by providing an electrical box comprising a base having a collar with an axial passage, a top end, a bottom end adapted for coupling the base to an electrical box, and an inwardly extending coupling tab. A movable ring is slidably received in the collar. The movable ring has an axial passage, a top end and a bottom end. The top end has an inwardly extending mounting tab for supporting an electrical wiring device in the axial passage, and an outwardly extending support flange with a dimension for contacting an outer surface of a wall during installation of the electrical box extension. The movable ring has a coupling tab extending into the axial passage. A fastener with a movable end is coupled to the coupling tab on the first ring and a second end coupled to the coupling tab on the base. The fastener is adapted for clamping the support flange against the outer surface of the wall during installation.

The various features of the invention are also attained by providing an electrical box extension comprising a base having an axial passage with an open top end and an open bottom end. The bottom end has a mounting flange for mounting the base to an electrical box. A movable ring is slidably received in the axial passage of the base. The movable ring has a top end with a mounting tab for supporting an electrical wiring device. The top end further has an outwardly extending support flange for contacting an outer surface of a wall and supporting the movable ring. The movable ring has a coupling tab with a screw hole extending inwardly and aligned with the coupling tab of the base. A coupling screw extends between the mounting flange on the base and the coupling tab on the movable ring. The screw is adapted for drawing the movable ring into the base to clamp the support flange into contact with the outer surface of the wall.

These and other objects, advantages and features of the invention will become apparent from the following detailed description of the invention, which in conjunction with the annexed drawings, disclose various embodiments of the invention.

BRIEF DESCRIPTION OF THE DRAWINGS

The following is a brief description of the drawings in which.

DETAILED DESCRIPTION OF THE INVENTION

Figure 1:
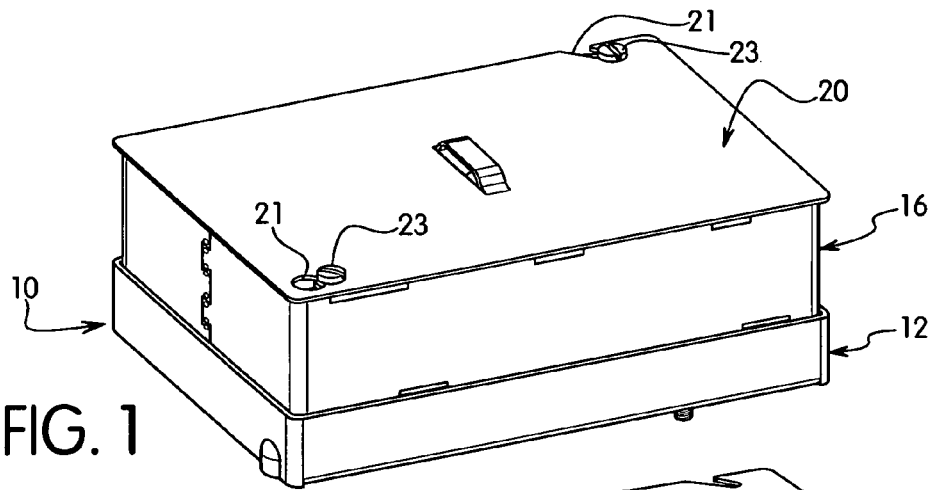
FIG. 1 is a perspective view of the electrical box extension and cover.

The present invention is directed to an electrical box extension assembly. In particular, the invention is directed to an electrical box extension for mounting to a mounting plate or support surface of an electrical box or the open end of an electrical box that is mounted to a support where the electrical box extension is movable to a selected position relative to the wall surface. The electrical box extension functions as a mud ring as known in the art for mounting electrical wiring devices such as electrical receptacles, switches and GFCI outlets.

Referring to the drawings, the electrical box extension 10 includes a base 12, a movable ring 14, an extension ring 16, a support flange 18 and a removable cover 20. The cover 20 has a dimension corresponding to the shape of the rings 14 and 16 with screw holes 21 for receiving screws 23 to attach the cover 20 to the assembly. As shown in FIGS. 1-5, the electrical box extension 10 can be provided as an assembly or kit where the selected components can be used as needed for the work site. In the drawings, the electrical box extension 10 is shown as a three-gang unit. It will be understood that the electrical box extension can be a single-gang, double-gang or multi-gang unit.

Figure 2:
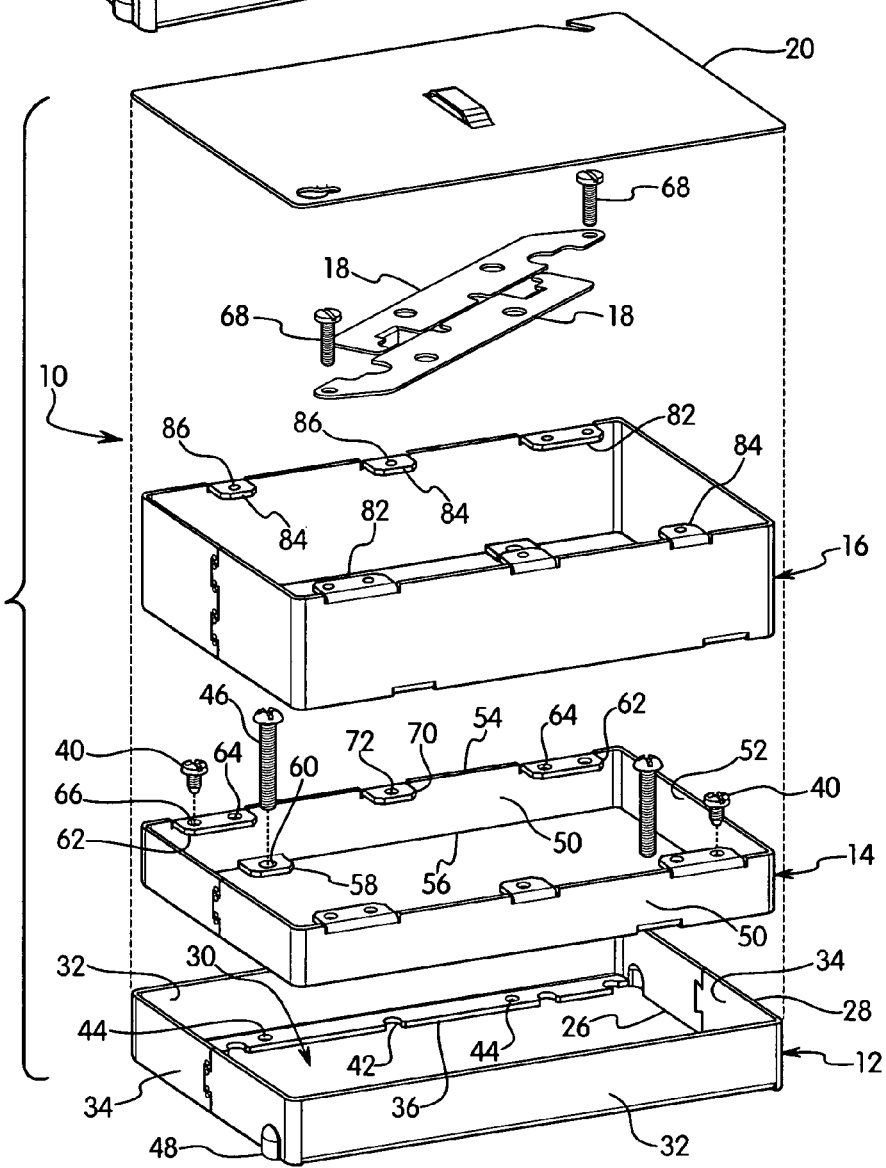
FIG. 2 is an exploded perspective view of the electrical box extension and cover.
Figure 6:
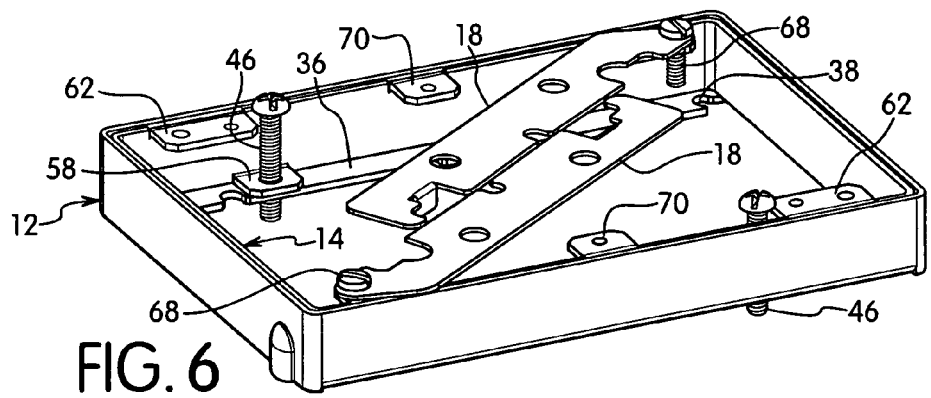
FIG. 6 a perspective view of the movable ring in the base in the retracted position.
Figure 8:
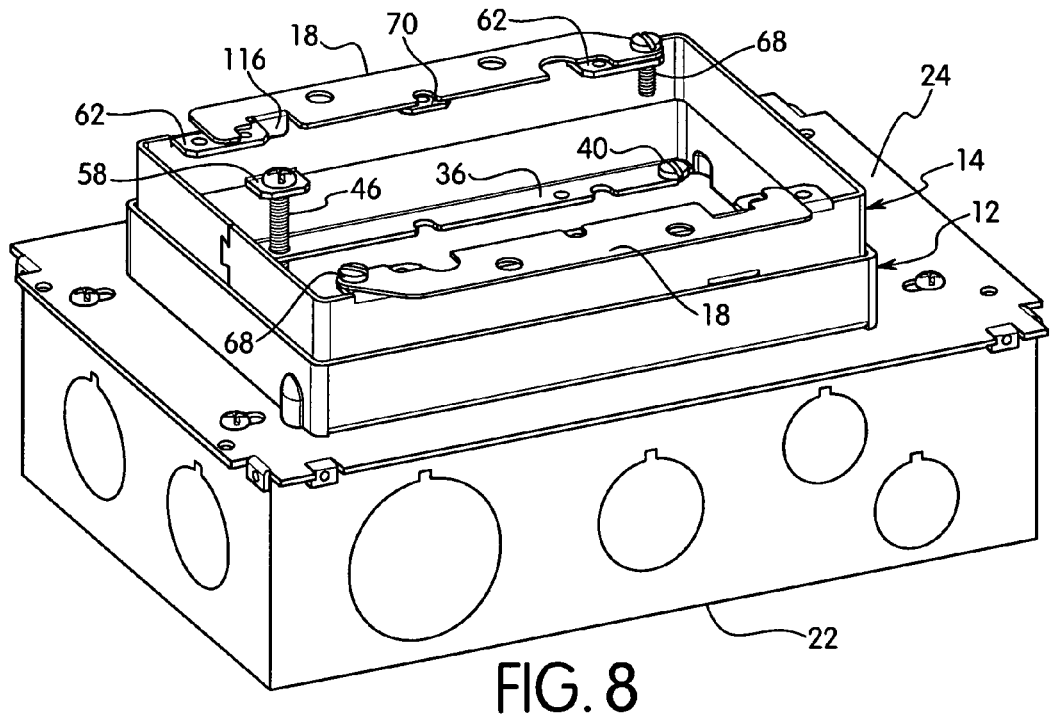
FIG. 8 is a perspective view of the base and movable ring coupled to the electrical box.
Figure 9:
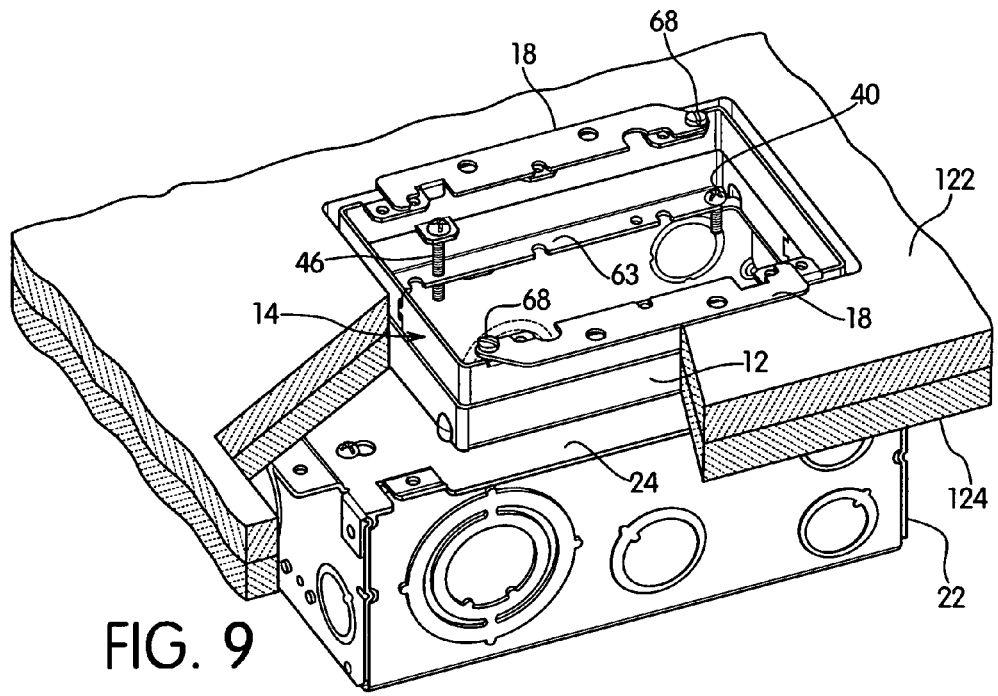
FIG. 9 is a perspective view of the base and movable ring coupled to an electrical box installed in a wall.
Figure 13:
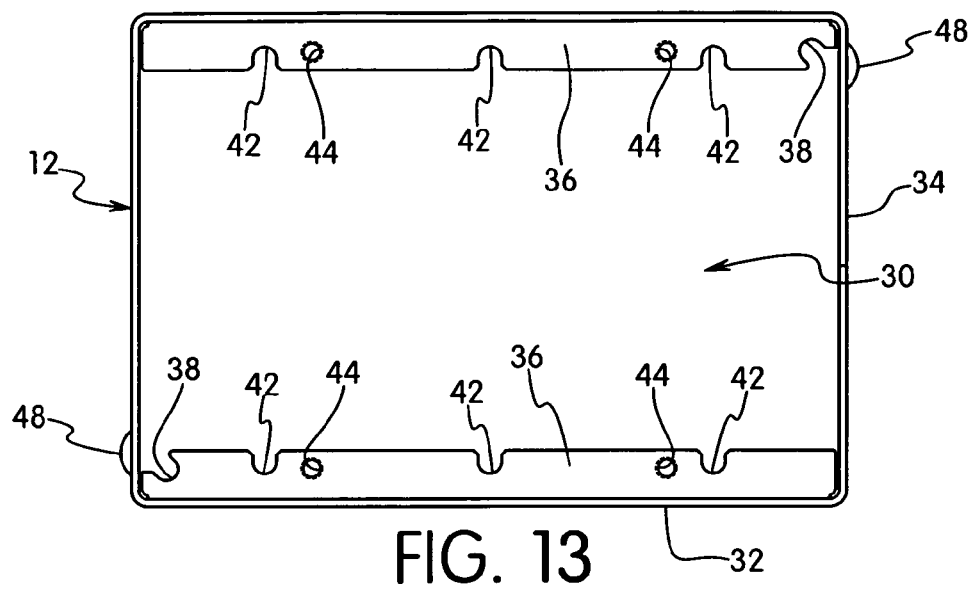
FIG. 13 is a top view of the base.
Figure 14:
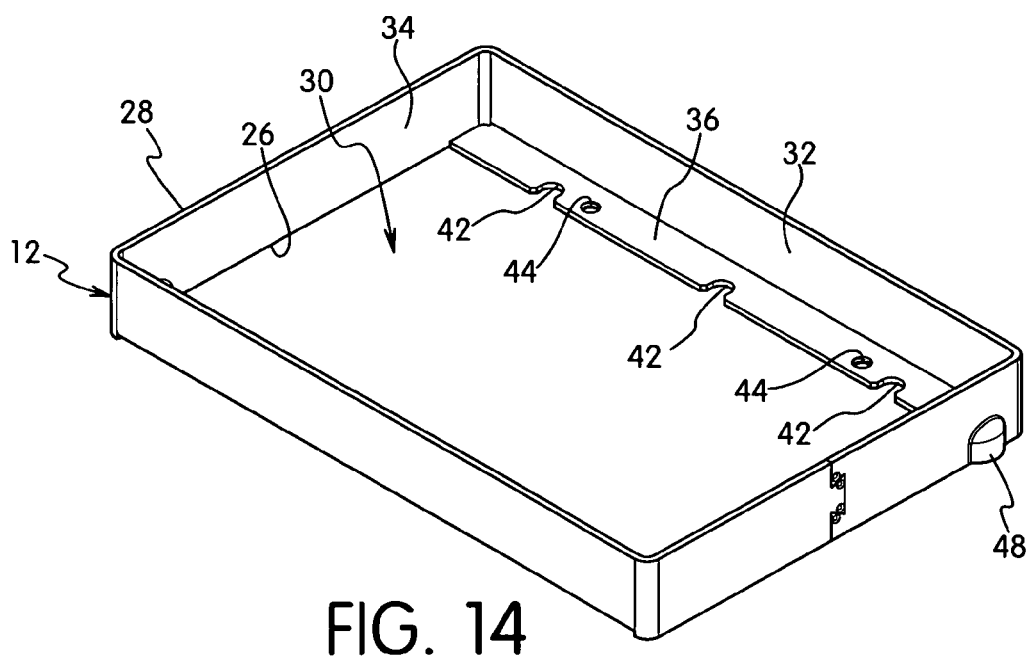
FIG. 14 is a perspective view of the base of FIG. 13.

Base 12 has a shape and dimension corresponding to the open end of an electrical box 22 or the opening in a support surface such as a top mounting plate 24 that is coupled to the top mounting plate 24 of an electrical box as shown in FIGS. 8 and 9. In alternative embodiments, the base 12 can be coupled directly to the open end of an electrical box 22. In the embodiment shown, the base 12 has a substantially rectangular configuration with an open bottom end 26 and an open top end 28 forming an axial passage 30 as shown in FIGS. 2 and 14. The base 12 has a collar formed by two opposing side walls 32 and two opposing end walls 34. In the embodiment shown, the base is made as a single piece from steel or other rigid material. Alternatively, the base can be made from separate wall sections that can be coupled together such as by welding. A coupling tab 36 extends inwardly from the bottom end 36 of each side wall 32 as shown in FIG. 6 and FIG. 13. In the embodiment illustrated in FIGS. 13 and 14, coupling tab 36 extends the length of each side wall 32 and extends between the end walls 34. The coupling tab 36 has a width sufficient for coupling to the top mounting plate 24 of the electrical box 22.

A longitudinal end of each of the coupling tabs 36 is provided with an opening 38 for receiving a coupling member such as mounting screw 40 for coupling the base 12 to the top plate 24 of the electrical box 22 as shown in FIG. 9. In the embodiment shown, opening 38 has a substantially U-shape recess for sliding onto the shaft of the mounting screw 40. The mounting screw 40 is threaded into a corresponding screw hole in the electrical box or top plate 24 so that the head of the screw contacts the surface of the coupling tab 36 to retain the base 12 in position. The top plate 24 has an open area corresponding to the dimension of the base and to access wiring in the electrical box.

As shown in FIGS. 13 and 14, each coupling tab 36 includes recesses 42 that are aligned with the intended position of the electrical wiring devices mounted to the electrical box extension ring 16 or the movable ring 14. The recesses 42 are positioned to avoid interference with the mounting screws of the electrical wiring devices.

At least one threaded hole 44 as shown in FIG. 14 is provided in the coupling tab 36 for receiving a coupling member or fastener for coupling the movable ring 14 to the base 12. The coupling member in the illustrated embodiment is a screw 46. Each end wall 34 includes a protruding portion 48 forming a concave recess on the inner face of the end wall to prevent interference with the mounting screw 40 during assembly.

Figure 7:
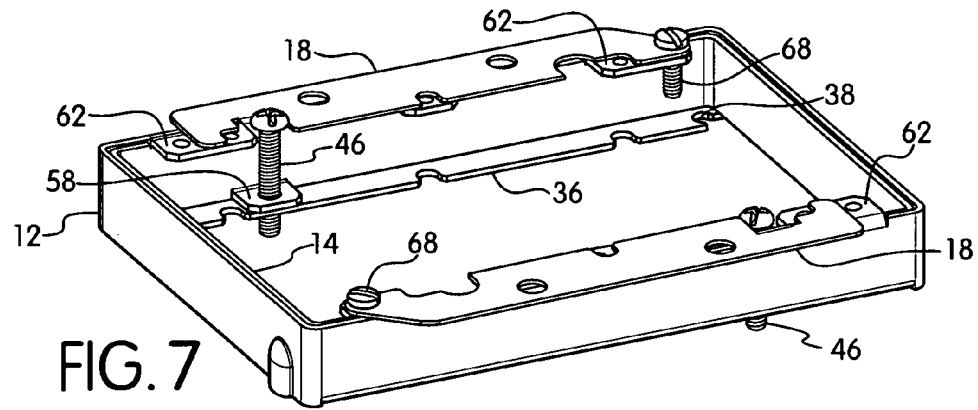
FIG. 7 is a perspective view of the base and movable ring with the support flanges in an extended position.
Figure 15:
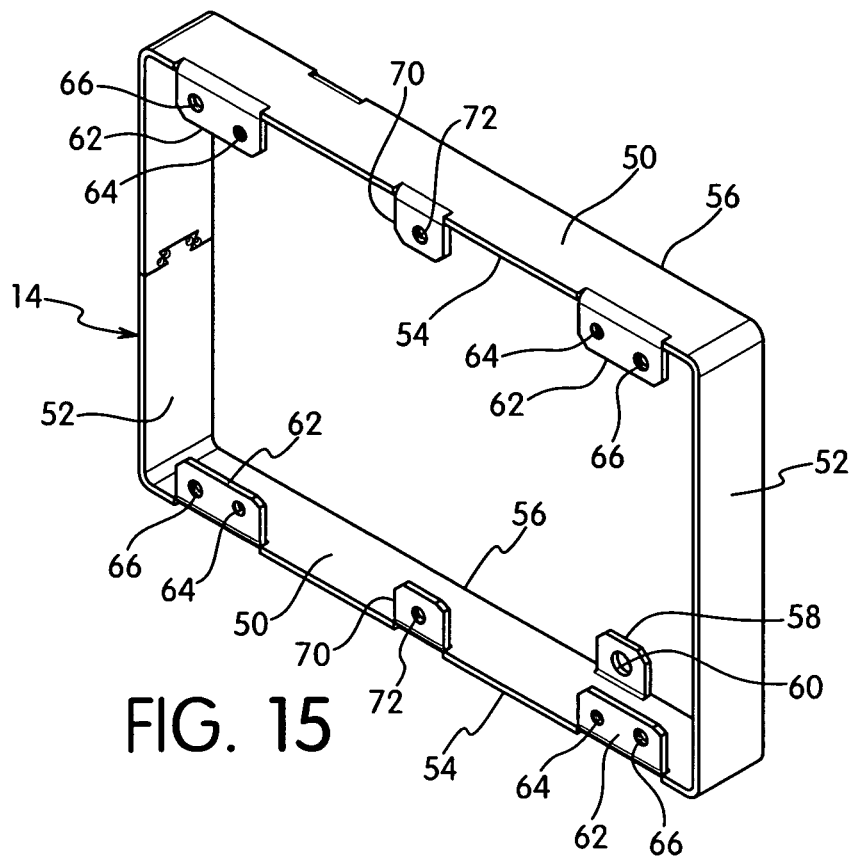
FIG. 15 is a perspective view of the movable ring.

The movable ring 14 has a shape and dimension corresponding to the inner dimension of the base 12 to slide axially within the open top end of the base 12 and the axial passage 30. Referring to FIG. 15, the movable ring 14 has opposing longitudinal side walls 50 and end walls 52. The movable ring 14 is able to slide within the axial passage 30 of the base 12 from a retracted position shown in FIGS. 6 and 7 to an extended position shown in FIG. 8. In the embodiment shown, the side walls 50 and end walls 52 have a height corresponding substantially to the height of the side walls 32 and end walls 34 of the base 12. In the retracted position shown in FIGS. 5 and 6, the movable ring 14 is received within the base 12 so that the respective top edges of the base 12 and the top end of the movable ring 14 are aligned. The downward movement of the ring 14 in the retracted position is limited by the bottom end of the movable ring contacting the tab 36 of the base 12. The upward movement of the movable ring 14 in the extended position is limited by the position of the screws 46.

Figure 16:
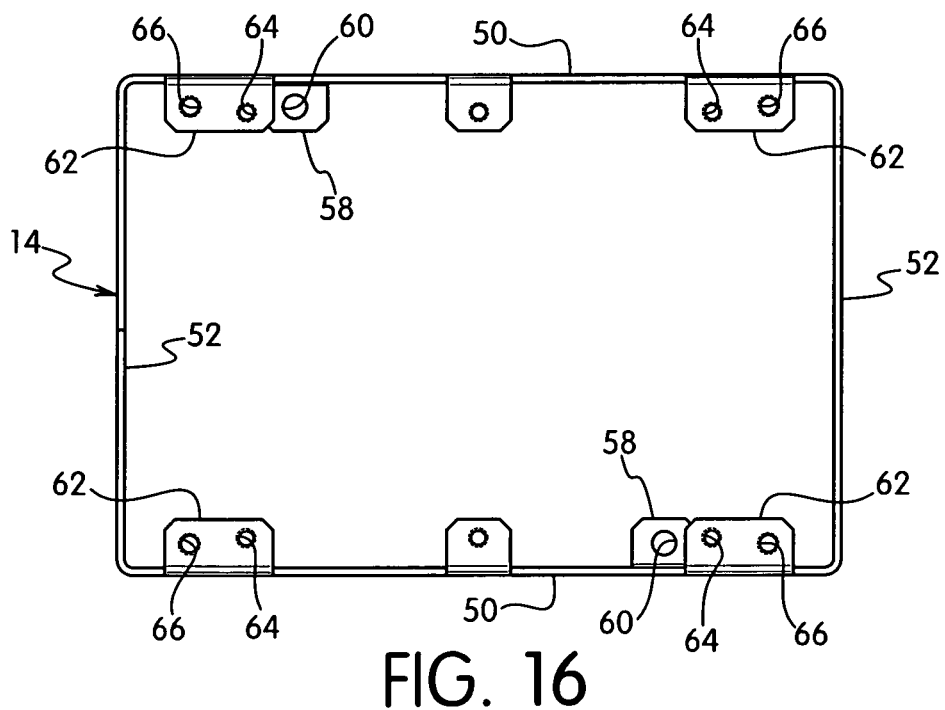
FIG. 16 is a top view of the movable ring of FIG. 15.

The movable ring 14 has a top edge 54 and a bottom edge 56 as shown in FIGS. 15 and 16. The bottom edge 56 includes a coupling tab 58 extending inwardly at each corner that is positioned for aligning with the threaded hole 44 of the base 12. Each coupling tab 58 includes a screw hole 60 for receiving the screw 46. The screw hole 60 has a dimension to allow the screw 46 to slide axially through the hole so that the movable ring 14 can slide on the screw 46 between the retracted position and the extended position.

The top edge 54 of the movable ring 14 includes inwardly extending mounting flanges 62 positioned at or near each corner on the side walls 50 next to the end walls 52. Each mounting flange 62 includes a threaded aperture 64 for receiving the mounting screw of an electrical wiring device and a threaded aperture 66 for receiving a coupling screw 68 for removably coupling the support flange 18 to the movable ring 14 and enabling pivoting movement of the support flange 18 with respect to the ring 14.

Figure 3:
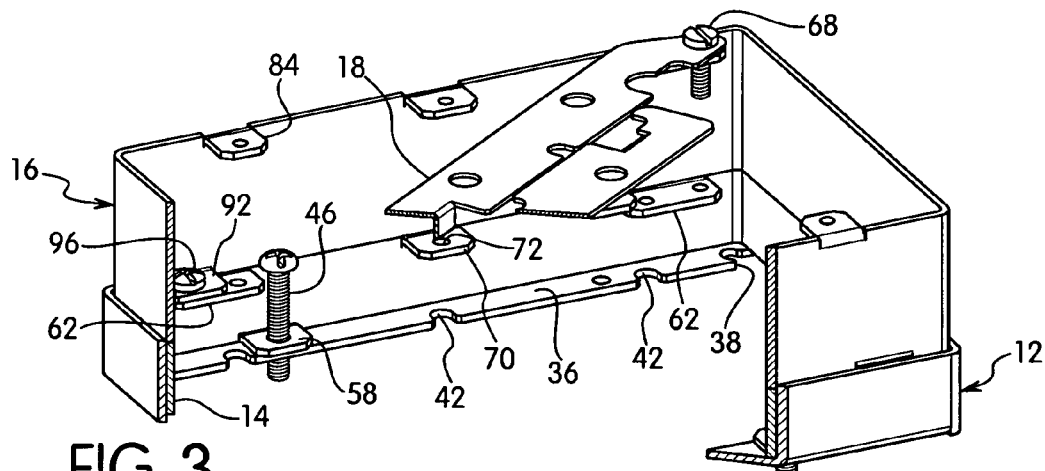
FIG. 3 is a partial perspective cross-sectional view of the electrical box assembly showing the support flanges folded inwardly in the retracted position.

As shown in FIG. 3, the coupling tab 36 of the base 12 is spaced from the coupling tab 58 to allow access to the screw 46 from the top end of the electrical box extension 10 without interference by the mounting flanges 62. The threaded apertures 64 in the coupling tabs 58 are axially aligned with a corresponding recess 42 so that the mounting screw for the electrical wiring device can be coupled to the coupling tab 58 without interference by the coupling tab 36 on the base 12. Each mounting flange 62 has a dimension sufficient for supporting the electrical wiring device. A centrally positioned mounting flange 70 having a screw hole 72 is provided on each side wall 50 positioned between the mounting flanges 62 for supporting an electrical wiring device. In the embodiment illustrated, the electrical box extension 10 has a size and shape for supporting three electrical wiring devices such as a switch or duplex receptacle. In other embodiments, the electrical box extension 10 can be a single gang or two gang device.

The extension ring 16 has a shape and size corresponding to the shape and size of the movable ring 14 and is adapted for being joined to the movable ring 14 to increase the axial length of the movable ring 14. As shown in FIG. 3, the extension ring 16 has a length and width corresponding to the dimension of the movable ring 14 so that the axial end of the extension ring 16 abuts the top edge 54 of the movable ring 14. In the illustrated embodiment, the extension ring 16 has a height greater than a height of the movable ring 14.

Figure 4:
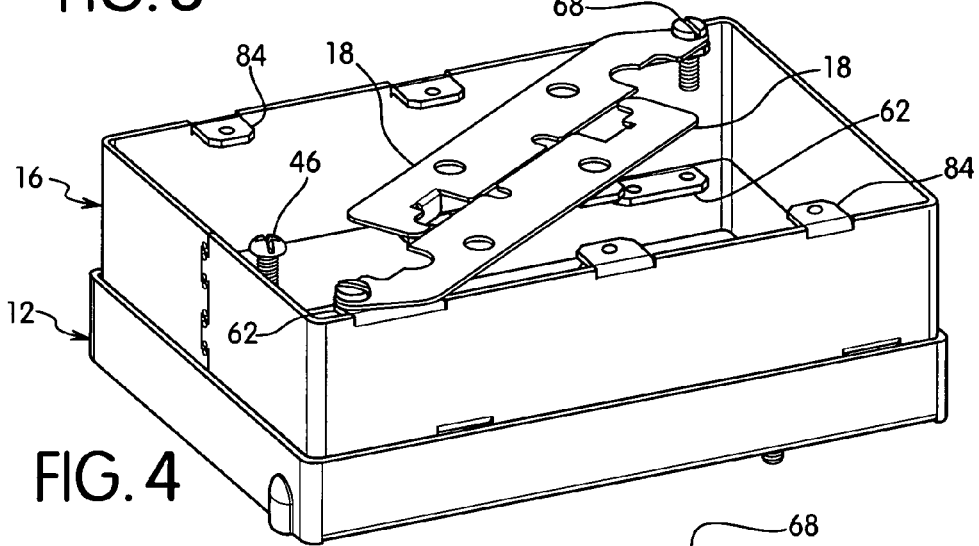
FIG. 4 a perspective view of the electrical box assembly of FIG. 2 in the retracted position with the cover removed.
Figure 5:
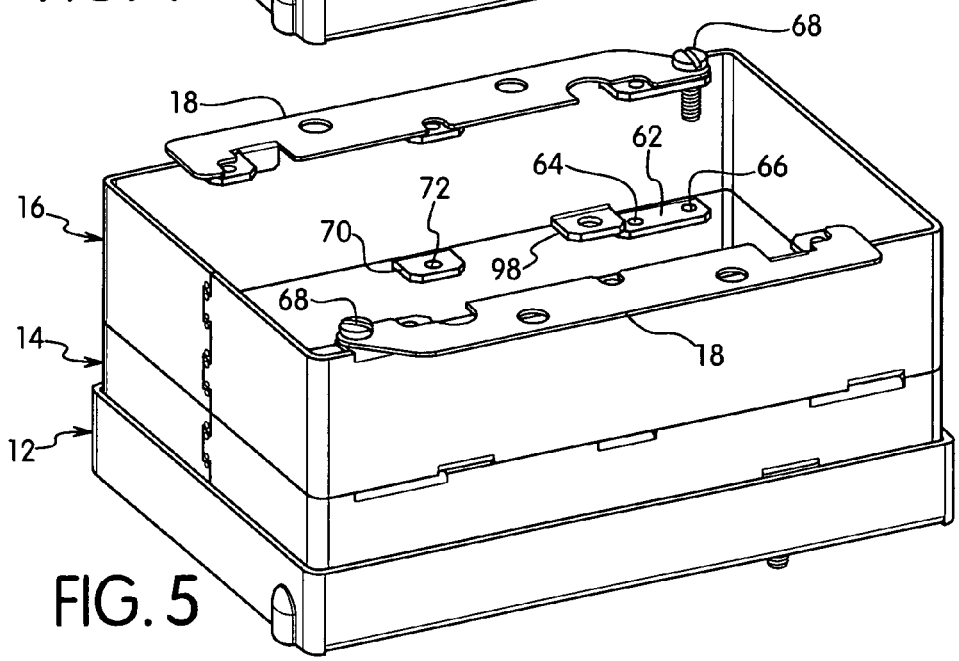
FIG. 5 is a perspective view of the movable ring with the support flanges coupled to the movable ring in the extended position.
Figure 19:
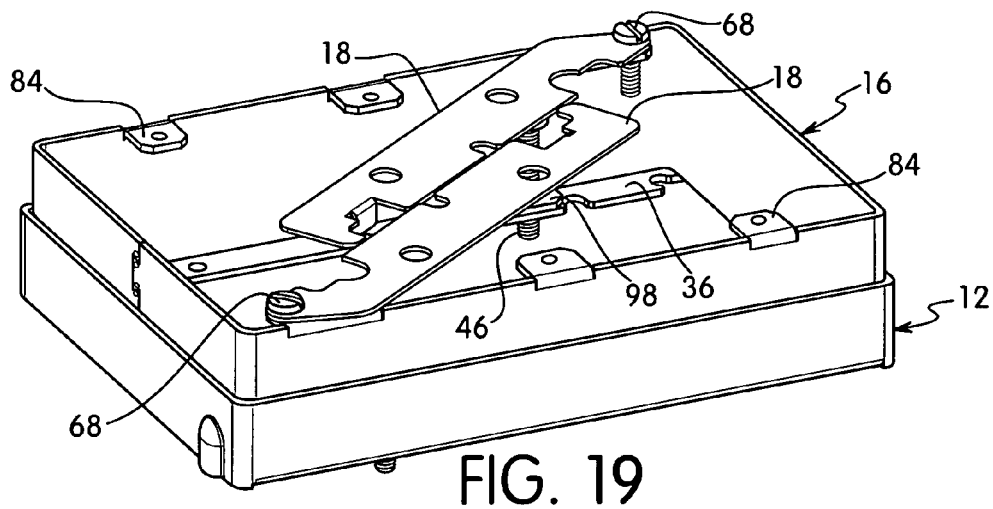
FIG. 19 is a perspective view of the extension ring coupled directly to the base in the retracted position.
Figure 20:
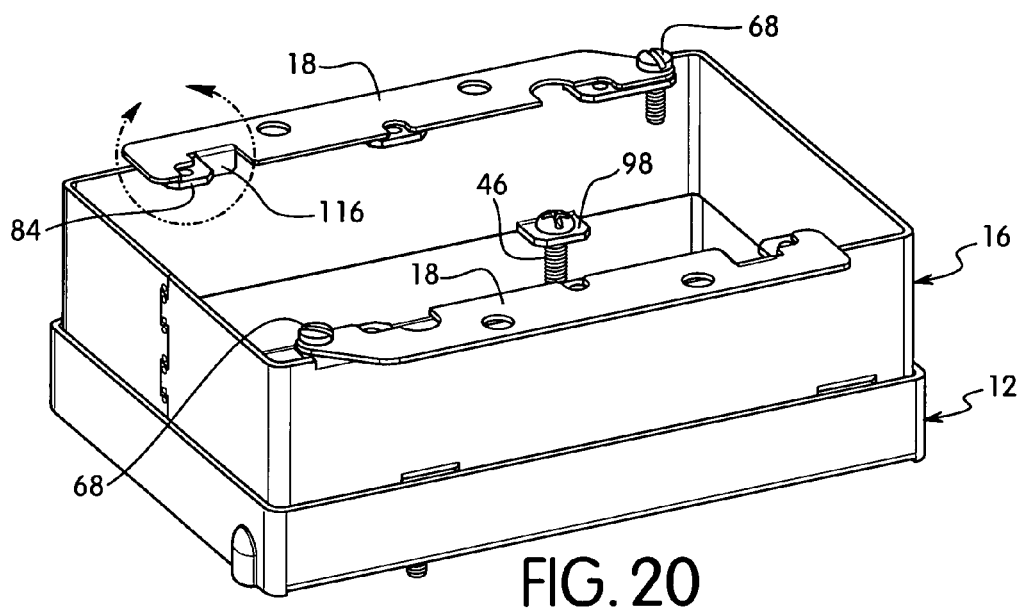
FIG. 20 is a perspective view of the extension ring and base of FIG. 19 in the extended position.

The extension ring 16 is similar to the movable ring 14 and can function as a movable ring when coupled directly to the base 12 as shown in FIGS. 19 and 20 or can be coupled to the movable ring 14 as ring assembly for increasing the axial length of the movable ring 14 as shown in FIGS. 3-5. As shown in FIGS. 19 and 20, the extension ring can be used independently from the movable ring and is interchangeable with the movable ring 14.

Figure 17:
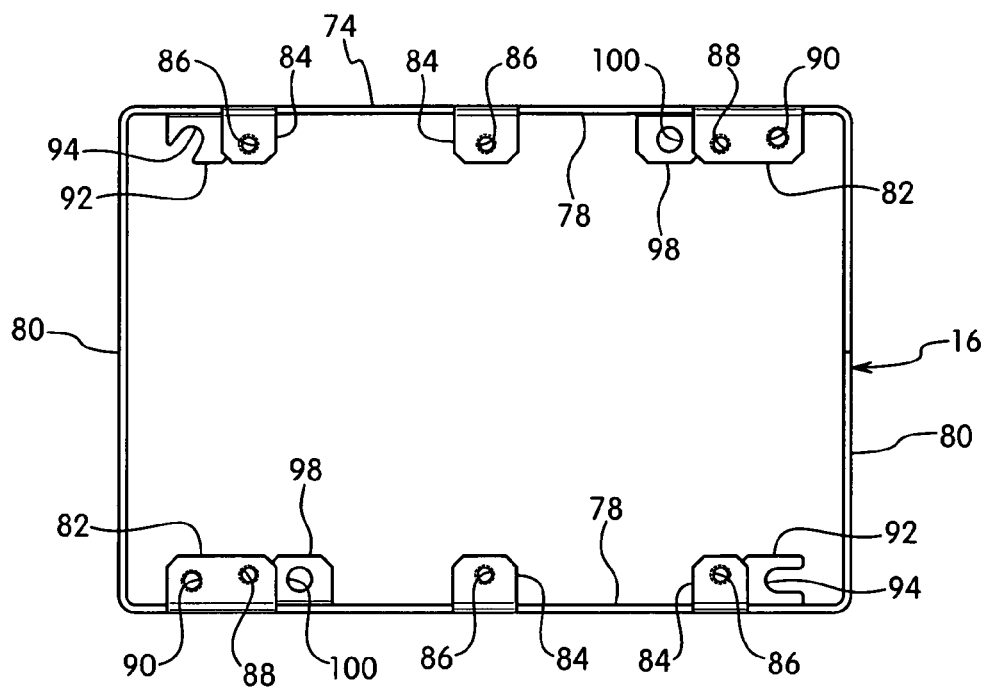
FIG. 17 is a top view of the extension ring.
Figure 18:
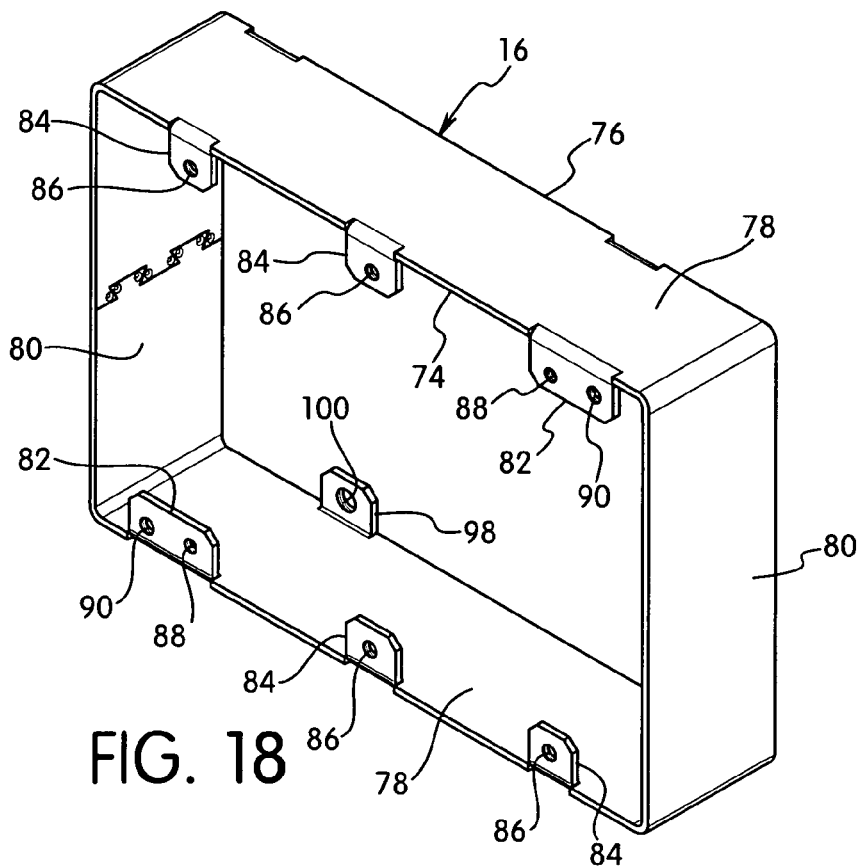
FIG. 18 is a perspective view of the extension ring of FIG. 17.

Referring to FIGS. 17 and 18, the extension ring 16 has a top edge 74 and a bottom edge 76 formed by longitudinal side walls 78 and end walls 80. The top end 74 of each side wall 78 has a mounting flange 82 next to the respective end wall 80 and mounting flanges 84 oriented for supporting an electrical wiring device such as a duplex receptacle. The mounting flanges 84 include a single threaded aperture 86 for receiving the coupling screw on the electrical wiring device. The mounting flanges 82 include a first threaded aperture 88 for receiving the mounting screw of the electrical device and a threaded hole 90 for receiving the screw 68 of the support flange 18 as shown in FIG. 5.

Figure 21:
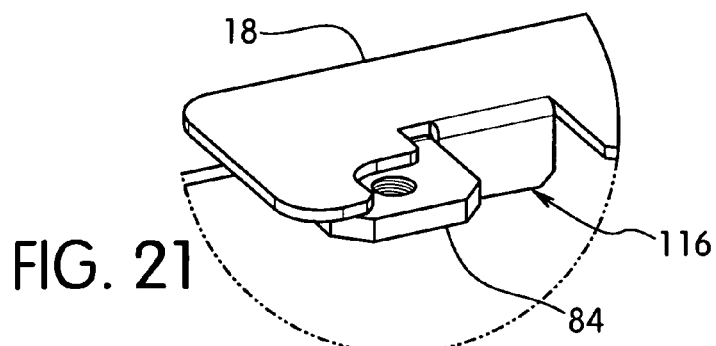
FIG. 21 is a partial perspective view of the support flange coupled to the mounting tab of the extension ring.

The bottom edge 76 of the extension ring 16 includes a coupling tab 92 extending inwardly from each side wall 78 next to the respective end wall 80 as shown in FIG. 17. The coupling tab 92 includes a hole shown as a slot 94 shown in FIG. 17 for receiving a coupling screw 96 as shown in FIG. 3. The screw 96 extends through the slot 94 in the coupling tab 92 and can be threaded into the threaded hole 66 in the mounting flange 62 for coupling the extension ring 16 directly to the top end of the movable ring 14 as shown in FIG. 3. Each side wall 78 is provided with an inwardly extending adjustment tab 98 that is oriented toward the opposite end wall 80 from the coupling tab 92. The adjustment tab 98 includes a hole 100 with an inner dimension that allows the screw 46 to slide through the hole. The adjustment tab 98 is positioned to align with the hole 60 in the coupling tab 58 of the base 12. The extension ring 16 can be coupled directly to the movable ring 14 as shown in FIGS. 3 and 4 for sliding movement with respect to the base 12. Alternatively, the extension ring 16 can be coupled directly to the base 12 as shown in FIGS. 19, 20 and 21 for adjustable movement in the same manner as the movable ring 14.

The support flange 18 as shown in the drawings is movable between a retracted position shown in FIG. 4 and an extended position shown in FIG. 5 so that the support flange 18 extends outwardly from the side wall of the movable ring 14 and the extension ring 16. The support flange 18 is adapted for coupling to either the top end of the movable ring 14 and to the top end of the extension ring 16. The support flange 18 is moved to the retracted position so that the support flange 18 is within the perimeter of the movable ring 14 and the extension ring 16 during shipping and packaging to minimize space requirements. When in use, the support flange 18 is pivoted outwardly to extend beyond the perimeter of the movable ring 14 and extension ring 16 as shown in FIG. 9 to engage the outer face of the wall surface.

Figure 10:
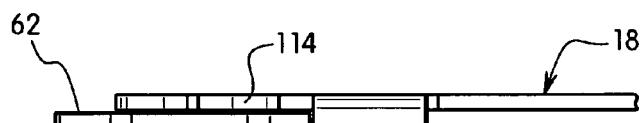
FIG. 10 a partial elevational view showing the support flange coupled to the mounting tab for an electrical wiring device.
Figure 11:
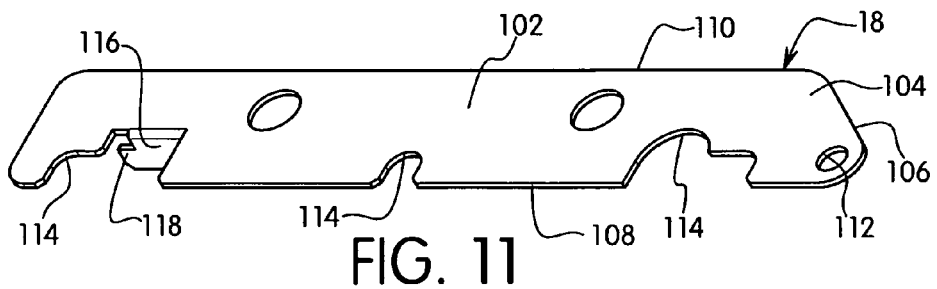
FIG. 11 is a perspective view of the support flange.
Figure 12:
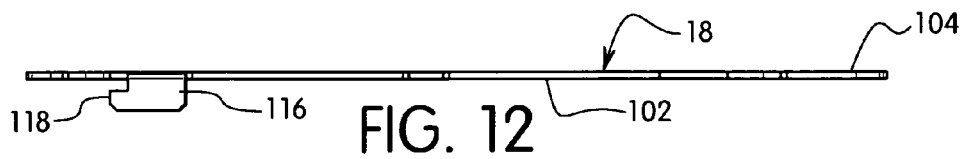
FIG. 12 is a front view of the support flange of FIG. 11.

The support flange 18 as shown in FIGS. 10, 11 and 12 has a body 102 with a longitudinal dimension to extend a substantial portion of the length of the side wall of the movable ring 14 and/or the extension ring 16. The body 102 has a first end 104 with an inclined end face 106 extending between an inner edge 108 and an outer edge 110. The first end 104 includes an aperture 112 for receiving the screw 68 for coupling the support flange 18 to the movable ring 14 or the extension ring 16. As shown in the drawings, the screw 68 is threaded into the threaded aperture 66 on the mounting flange 62 of the movable ring 14 or the threaded aperture 90 in the mounting flange 82 of the extension ring 16. The screw 68 allows the support flange 18 to pivot between the retracted position shown in FIG. 4 and the extended position shown in FIG. 9.

The inner edge 108 of the body 102 includes a plurality of recesses 114 that align with the threaded apertures in the mounting flanges to allow the mounting screws of the electrical wiring device to be threaded into the respective mounting flanges without interference from the support flange 18. A tab 116 forming a stop member is integrally formed with the body 102 and is bent in a downward direction substantially perpendicular to the plane of the body 102. As shown in FIG. 10, the tab 116 includes a hook member 118 along a side edge for hooking under the mounting flange 62 as shown in FIG. 9 to prevent upward movement of the support flange 18 with respect to the movable ring 14.

The electrical box extension 10 in one embodiment is provided with the movable ring 14 and the extension ring 16. During use, either the movable ring 14 or the extension ring 16 can be used individually with the base 12. In other embodiments, the movable ring 14 and extension ring 16 can be coupled together and used together depending on the depth of the wall material. In the embodiment shown in FIG. 9, the base 12 is coupled to the movable ring 14 without the extension ring 16. The base 12 can be coupled directly to the open top end of an electrical box or to a cover plate 24 coupled to an electrical box. The electrical box 22 is typically mounted to a wall stud or support frame in a typical manner so that the electrical box is in a fixed position. The support flanges 18 are pivoted to the retracted position and the movable ring 14 is manually pulled away from the base 12 to a position where the support flanges 18 can pivot outwardly to contact the outer face 122 of a wall 124 as shown in FIG. 9. The screws 46 are then tightened to draw the movable ring 14 towards the base 12 until the support flanges 18 are compressed against the outer face 122 of the wall 124. The screws 44 are tightened to prevent movement of the movable ring 14 as shown in FIG. 12. Electrical wiring devices (not shown) are then mounted to the flanges 62 of the open top end of the movable ring 14 and connected to a suitable electrical supply within the electrical box in a standard manner.

As shown in the embodiment of FIG. 3, the extension ring 16 can be coupled directly to the movable ring 14. The support flanges 18 are coupled to the top end of the extension ring 16 to pivot between the retracted position shown in FIG. 3 and the extended position shown in FIG. 5. The position of the movable ring 14 and extension ring 16 are positioned with respect to the base 12 with the support flanges contacting the outer face of the wall in a manner substantially the same as shown in FIG. 9.

In the embodiment shown in FIGS. 19 and 20, the extension ring 16 can be used alone and coupled directly to the base 12. The position of the extension ring 16 with respect to the base 12 can be adjusted in a similar manner by tightening the screw 46. In the embodiments shown in the drawings, the extension ring 16 has an axial length greater than the axial length of the movable ring 14. The axial length of the movable ring 14 and the extension ring 16 are selected to accommodate varying depths of the wall covering material. In this manner, the movable ring 14 and extension ring 16 can be used individually or together to enable the electrical wiring device to be mounted flush with the outer face of the wall material.

While various embodiments are shown to illustrate the invention, it will be understood by those skilled in the art that various changes and modifications can be made without departing from the scope of the invention as defined in the appended claims.

What is claimed is:

1. An electrical box extension comprising:
    a base having a top end and a bottom end, said bottom end being adapted for coupling to a support surface or an electrical box;
    a movable ring received in said base for sliding axially within said base, said movable ring having a top end and a bottom end, said top end having a mounting flange for supporting an electrical wiring device, and said movable ring having a support flange with a dimension to contact an outer surface of a wall during installation of said electrical box extension; and
    a coupling member coupled to said movable ring and to said base, said coupling member adapted to retract said movable ring into said base and move said support flange into contact with the outer surface of the wall for supporting said movable ring.

2. The electrical box extension of claim 1, wherein
    said base has an inwardly extending coupling tab at said bottom end of said base, said coupling tab having a screw hole for coupling said base to the support surface, and where said coupling member is coupled to said coupling tab.

3. The electrical box extension of claim 2, wherein
    said coupling member is a screw and where said coupling tab includes a threaded hole receiving said screw.

4. The electrical box extension of claim 3, wherein
    said movable ring has an inwardly extending coupling, tab at the bottom end of the movable ring with a screw hole to allow said screw hole to slide through said screw hole.

5. The electrical box extension of claim 2, wherein
    said movable ring has an inwardly extending coupling tab at said bottom end of said movable ring and where said coupling member is coupled to said coupling tab.

6. The electrical box extension of claim 1, wherein
said outwardly extending support flange is pivotally coupled to said movable ring to pivot between a retracted position and an extended position to extend outwardly from said movable ring.

7. The electrical box extension of claim 6, wherein
said support flange is pivotable from a retracted position within an outer edge of said movable ring to the extended position where the support flange overlies a top edge of said movable ring.

8. The electrical box extension of claim 6, wherein
said support flange has a first end pivotably connected to said movable ring and a second end with a stop member to limit outward pivotal movement of said second end.

9. The electrical box extension of claim 1, wherein
said support flange is removably coupled to said movable ring.

10. The electrical box extension of claim 1, further comprising
an extension ring coupled to said top end of said movable ring to extend the axial length of said movable ring, and where said support flange extends outwardly from a top edge of said extension ring.

11. The electrical box extension of claim 10, wherein
said extension ring has a bottom end with a mounting flange coupled to a top end of said movable ring and a top end with an inwardly extending mounting flange for mounting the electrical wiring device.

12. An electrical box extension comprising:
a base having a collar with an axial passage, a top end, a bottom end, and an inwardly extending coupling tab at said bottom end and being adapted for coupling said base to a support or an electrical box;
a movable ring slidably received in said collar, said movable ring having an axial passage, an open top end, and an open bottom end, said open top end having an inwardly extending mounting flange for supporting an electrical wiring device in said axial passage, and an outwardly extending support flange coupled to said movable ring and having a dimension for contacting an outer surface of a wall during installation of said electrical box extension, said movable ring having a coupling tab extending into said axial passage; and
a coupling member coupled to said coupling tab on said movable ring and to said coupling tab on said base, said coupling member adapted for retracting said movable ring and said support flange against the outer surface of the wall during installation of said electrical box.

13. The electrical box extension of claim 12, wherein
said coupling tab on said base is provided on a bottom edge of said base.

14. The electrical box extension of claim 13, wherein
said coupling tab on said base has a first hole for receiving a coupling screw for coupling said base to the electrical box and a second hole for receiving said coupling member.

15. The electrical box extension of claim 14, wherein
said coupling member is a screw threaded into said second hole in said coupling tab, and where said screw slides through a hole provided in said coupling tab on said movable ring.

16. The electrical box extension of claim 12, wherein
said support flange is removably coupled to said movable ring.

17. The electrical box extension of claim 12, wherein
said support flange is pivotally coupled to said movable ring to pivot said support flange between a retracted position and an extended position.

18. The electrical box extension of claim 12, wherein
said support flange is movable from a retracted position to an extended position.

19. The electrical box extension of claim 12, wherein
said support flange is pivotally coupled to said movable ring, and has a stop member to limit pivotal movement with respect to said movable ring.

20. The electrical box extension of claim 12, further comprising
an extension ring removably coupled to said top end of said movable ring to extend the axial length of the movable ring.

21. The electrical box extension of claim 20, wherein
said extension ring has a top end with said mounting flange coupled thereto, and a bottom end with an inwardly extending coupling tab for coupling to said movable ring, and where said top end includes an inwardly extending mounting tab for supporting the electrical wiring device.

22. The electrical box extension of claim 21, wherein
said extension ring has an outer dimension complementing the outer dimension of said movable ring.

23. An electrical box extension comprising:
a base having an axial passage with an open top end and an open bottom end, said open bottom end having a coupling tab for mounting said base to a support or an electrical box;
a movable ring slidably received in said axial passage of said base, said movable ring having a top end with a mounting flange for supporting an electrical wiring device, said top end further having an outwardly extending support flange for contacting an outer surface of a wall and supporting said movable ring, said movable ring having a coupling tab with a screw hole and extending inwardly and aligned with said coupling tab of said base; and
a coupling screw extending between said coupling tab of said base and said coupling tab on said movable ring, said screw adapted for retracting said movable ring into said base to clamp said support flange into contact with the outer surface of the wall.

24. The electrical box extension of claim 23, wherein
said coupling tab on said base extends inwardly from said bottom end of said base, and where said coupling tab has a threaded screw hole for receiving said coupling screw.

25. The electrical box extension of claim 24, wherein
said screw hole in said coupling tab on said movable ring has a dimension to allow said coupling screw to slide through, whereby said movable ring is slidable with respect to said base.

26. The electrical box extension of claim 23, wherein
said support flange on said movable ring is removably coupled to said movable ring.

27. The electrical box extension of claim 26, wherein
said support flange is movable between a retracted position within said movable ring and an extended position to extend outwardly from said movable ring.

28. The electrical box extension of claim 27, wherein
said support flange is pivotally coupled to said movable ring to pivot between said retracted position and said extended position.

29. The electrical box extension of claim 27, wherein said support flange is pivotally coupled to said top end of said movable ring and has a stop member to contact an inner surface of said movable ring to limit outward movement of said support flange.

30. The electrical box extension of claim 29, wherein said support flange includes a plurality of openings aligned with openings in said mounting tabs for supporting the electrical wiring device.

31. The electrical box extension of claim 23, wherein an extension ring is coupled to the top end of said movable ring to increase the axial length of said movable ring.

32. The electrical box extension of claim 31, wherein said extension ring has a bottom end with a coupling tab with a screw hole for receiving a screw to couple said extension ring to said movable ring.

33. The electrical box extension of claim 32, wherein said extension ring has a top end with a mounting flange adapted for supporting the electrical wiring device.

34. The electrical box extension of claim 33, wherein said support flange is coupled to said top end of said extension ring.

* * * * *